US012647308B2

(12) United States Patent
Kim

(10) Patent No.: US 12,647,308 B2
(45) Date of Patent: Jun. 2, 2026

(54) METHOD FOR TRANSMITTING ORTHOGONAL FREQUENCY DIVISION MULTIPLEXING SIGNAL ON BASIS OF RIS IN WIRELESS COMMUNICATION SYSTEM, AND DEVICE THEREFOR

(71) Applicant: LG ELECTRONICS INC., Seoul (KR)

(72) Inventor: Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 18/291,776

(22) PCT Filed: Aug. 3, 2021

(86) PCT No.: PCT/KR2021/010112
§ 371 (c)(1),
(2) Date: Jan. 24, 2024

(87) PCT Pub. No.: WO2023/013794
PCT Pub. Date: Feb. 9, 2023

(65) Prior Publication Data
US 2025/0106082 A1 Mar. 27, 2025

(51) Int. Cl.
*H04L 27/26* (2006.01)
*H04B 7/04* (2017.01)
(52) U.S. Cl.
CPC ..... *H04L 27/2613* (2013.01); *H04B 7/04013* (2023.05); *H04L 27/2607* (2013.01); *H04L 27/2628* (2013.01)
(58) Field of Classification Search
CPC ............. H04L 27/2607; H04L 27/2613; H04L 27/2628; H04B 7/04013; H04B 7/06
See application file for complete search history.

(56) References Cited

U.S. PATENT DOCUMENTS

| | | | | |
|---|---|---|---|---|
| 11,924,649 | B2 * | 3/2024 | Liu ........................ | H04W 16/28 |
| 2018/0048510 | A1 * | 2/2018 | Nadal ................. | H04L 27/2643 |
| 2018/0167130 | A1 * | 6/2018 | Vannucci ................. | H01Q 5/22 |
| 2018/0352590 | A1 | 12/2018 | Sha et al. | |
| 2022/0123803 | A1 * | 4/2022 | Rimalapudi ......... | H04B 7/0626 |

FOREIGN PATENT DOCUMENTS

CN          112911669          6/2021

OTHER PUBLICATIONS

PCT International Application No. PCT/KR2021/010112, International Search Report dated Apr. 19, 2022, 4 pages.
Ginige et al., "Untrained DNN for Channel Estimation of RIS-Assisted Multi-User OFDM System with Hardware Impairments," arXiv:2107.07423v1, Jul. 2021, 6 pages.
Lin et al., "Adaptive Transmission for Reconfigurable Intelligent Surface-Assisted OFDM Wireless Communications," IEEE Journal On Selected Areas in Communications, vol. 38, No. 11, Nov. 2020, 13 pages.

* cited by examiner

*Primary Examiner* — Zhubing Ren
(74) *Attorney, Agent, or Firm* — LEE, HONG, DEGERMAN, KANG & WAIMEY

(57) ABSTRACT

A method of a wireless device for transmitting an orthogonal frequency division multiplexing (OFDM) signal based on a reconfigurable intelligent surface (RIS) in a wireless communication system comprises determining a reflection coefficient related to the RIS, and generating the OFDM signal based on the RIS to which the determined reflection coefficient is applied.

12 Claims, 11 Drawing Sheets

【FIG. 1】
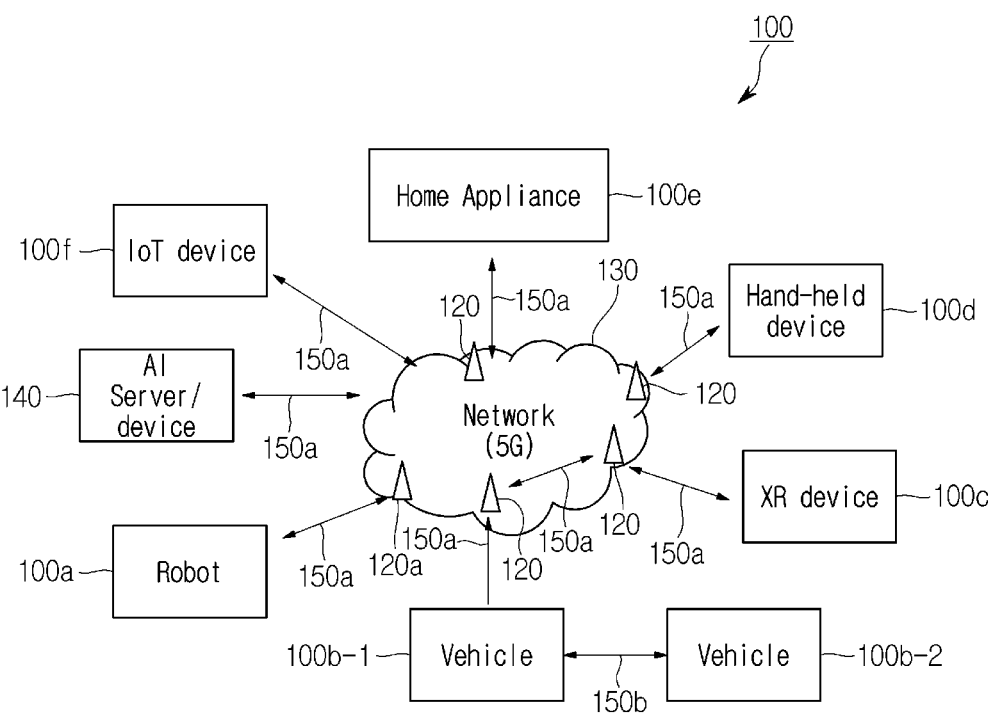
【FIG. 2】
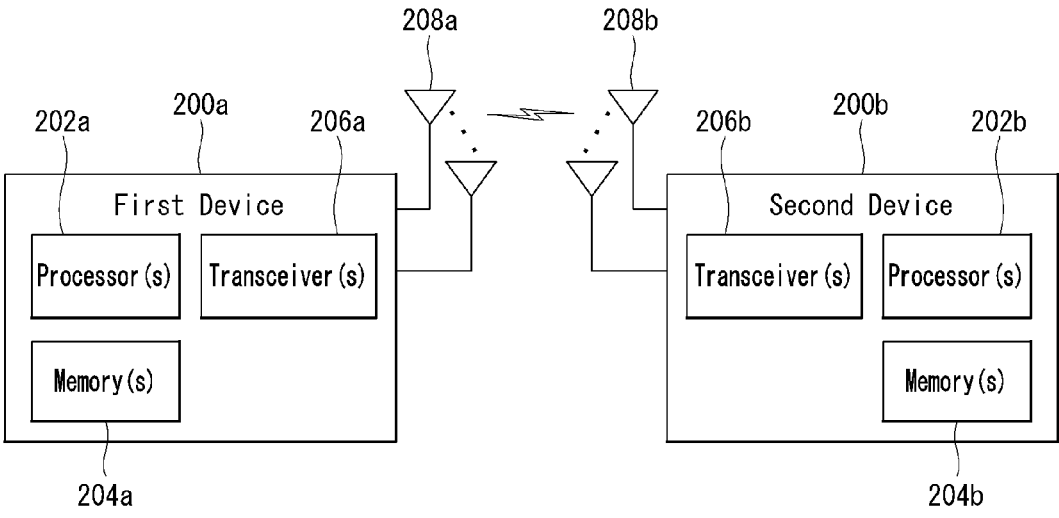

【FIG. 3】
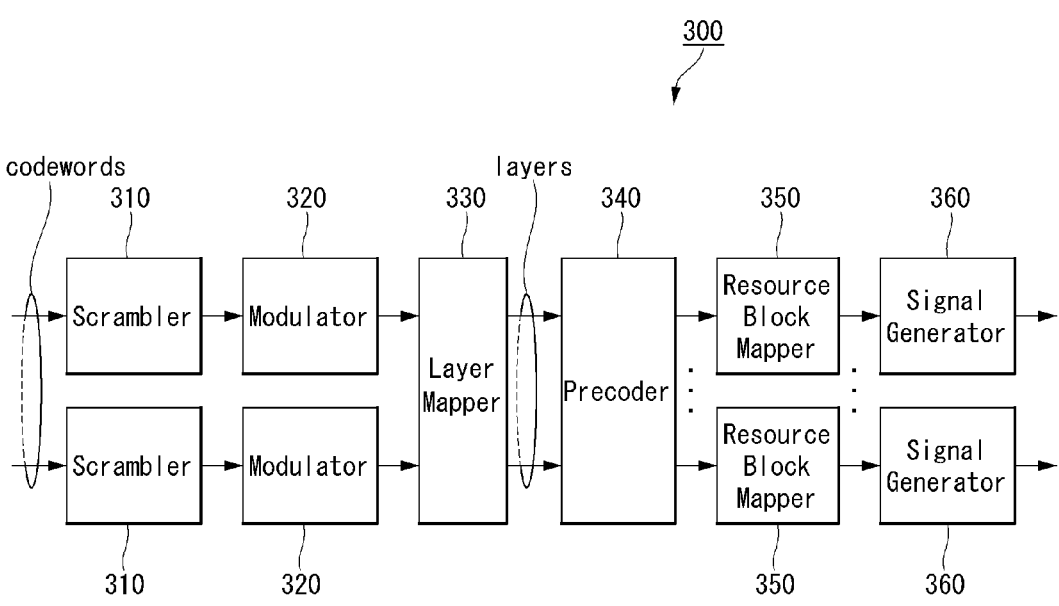
【FIG. 4】
Device(400)
Communication unit(410)
(e.g., 5G communication unit)
Communication circuit(412)
(e.g., processor(s),memory(s))
Transceiver(s)(414)
(e.g., RF unit(s),antenna(s))
Control unit(420)
(e.g., processor(s))
Memory unit(430)
(e.g., RAM, storage)
Additional components(440)
(e.g., power unit/battery,
I/O unit,driving unit,
computing unit)

【FIG. 5】
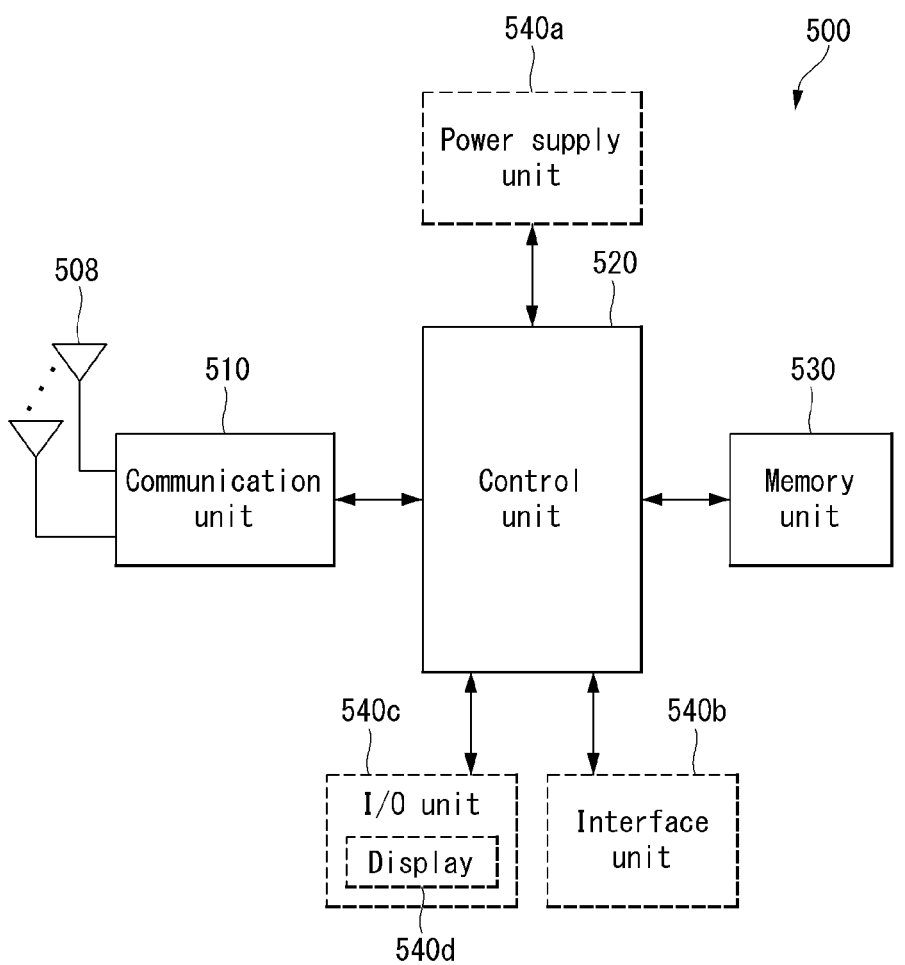
【FIG. 6】
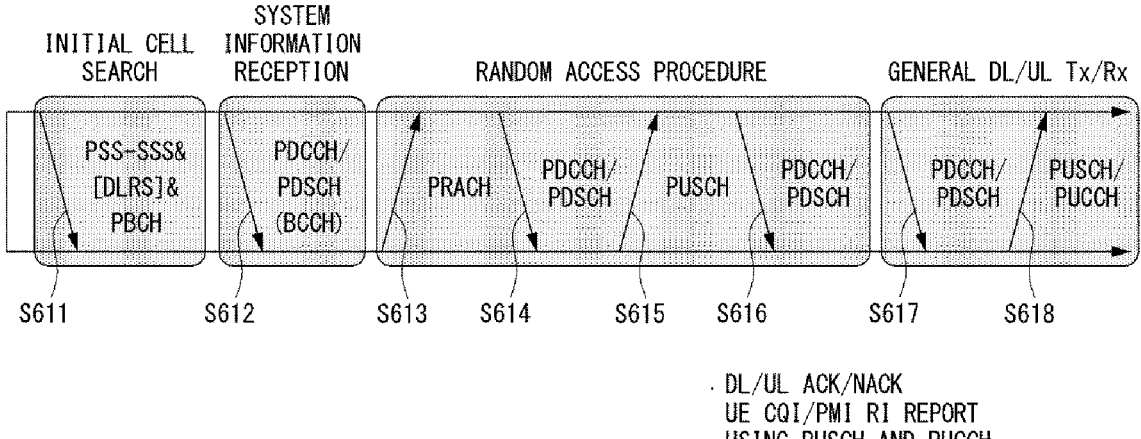
- DL/UL ACK/NACK
UE CQI/PMI RI REPORT
USING PUSCH AND PUCCH 【FIG. 7】
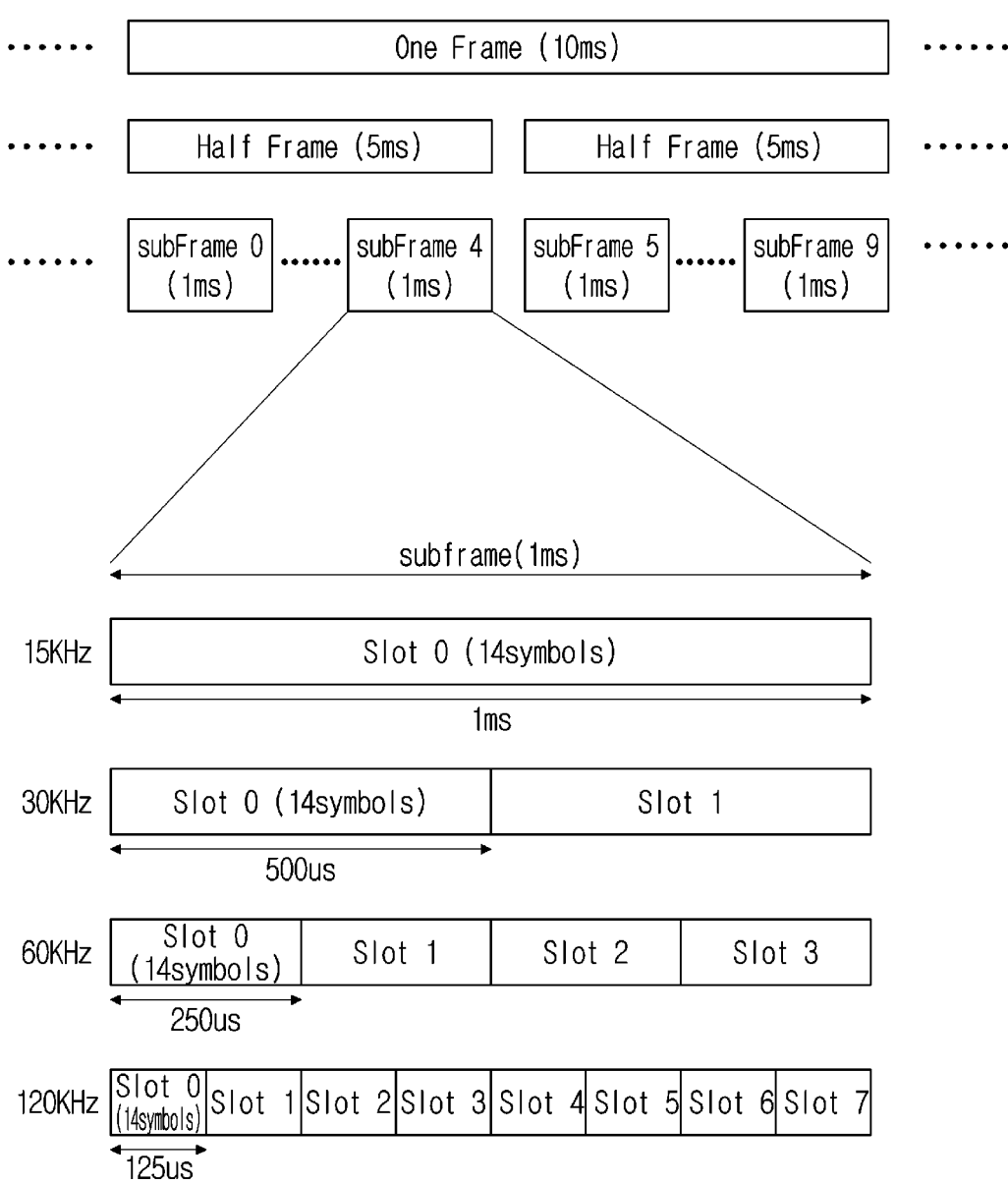

【FIG. 8】
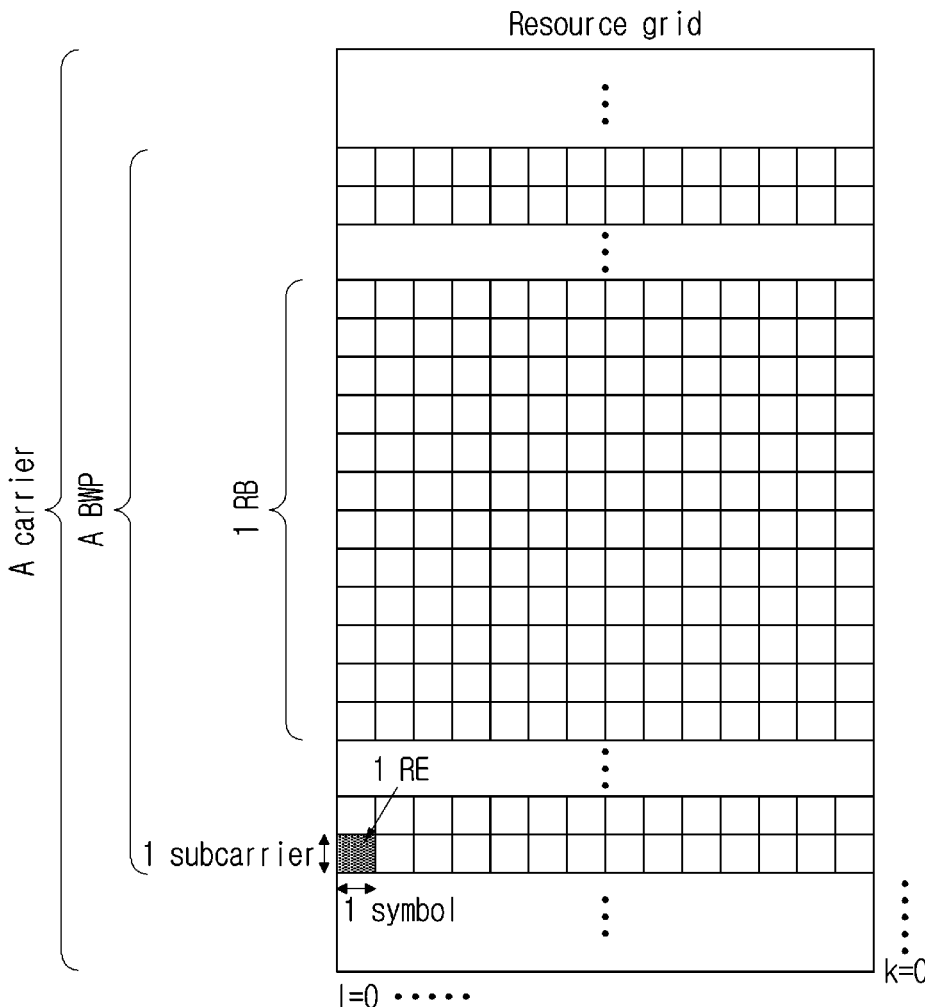

[FIG. 9]
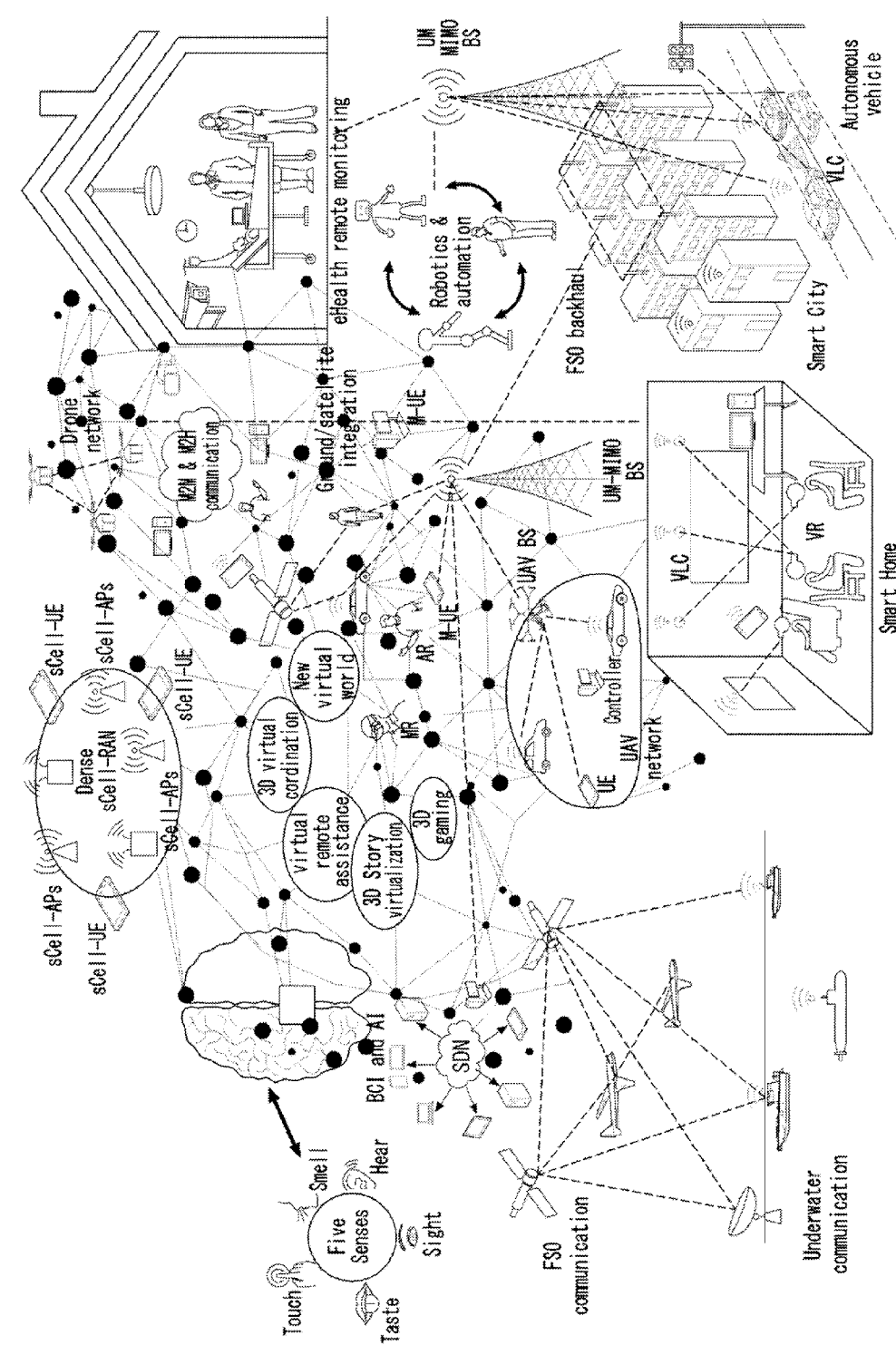

【FIG. 10】
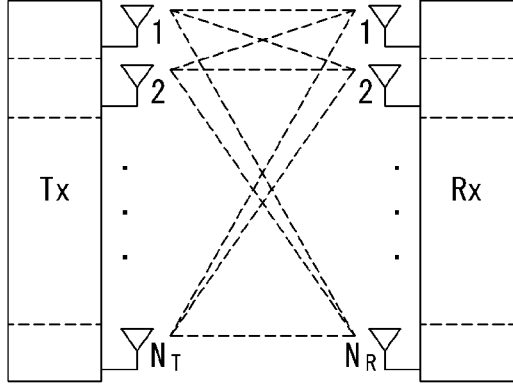
【FIG. 11】
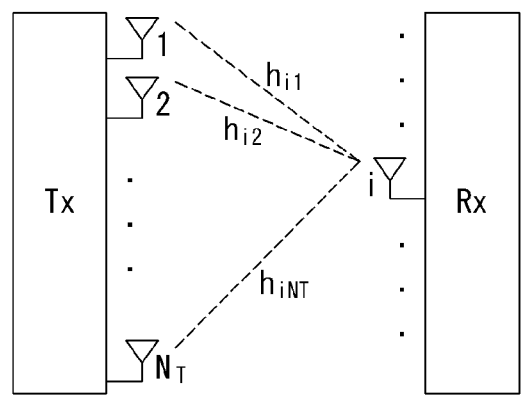
【FIG. 12】
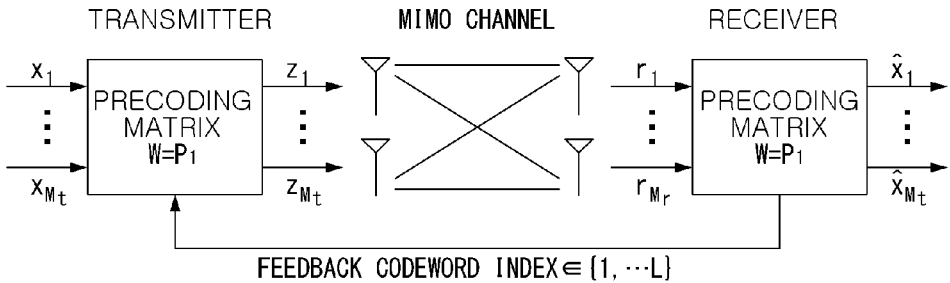

【FIG. 13】
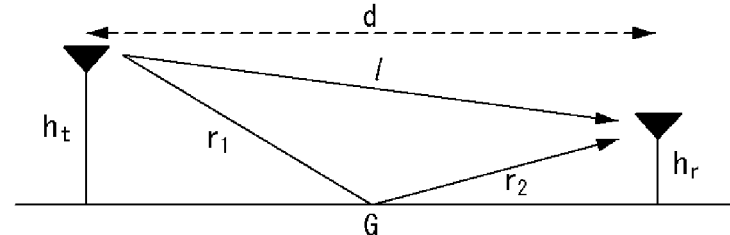
【FIG. 14】
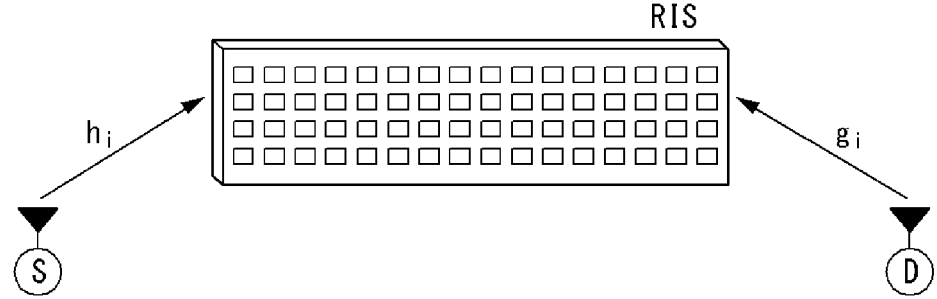

【FIG. 15】
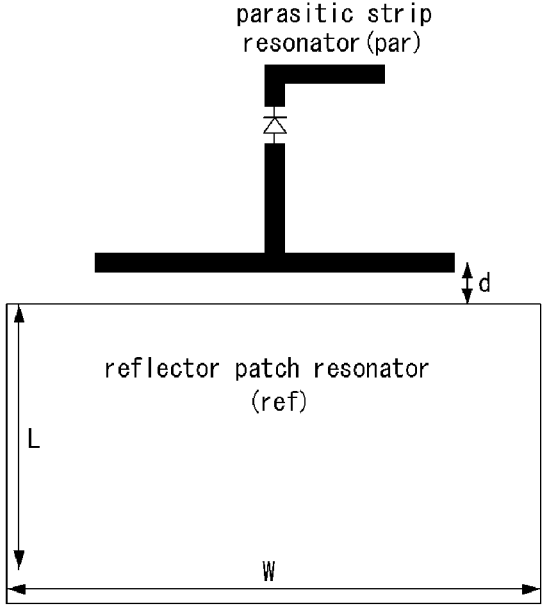
【FIG. 16】
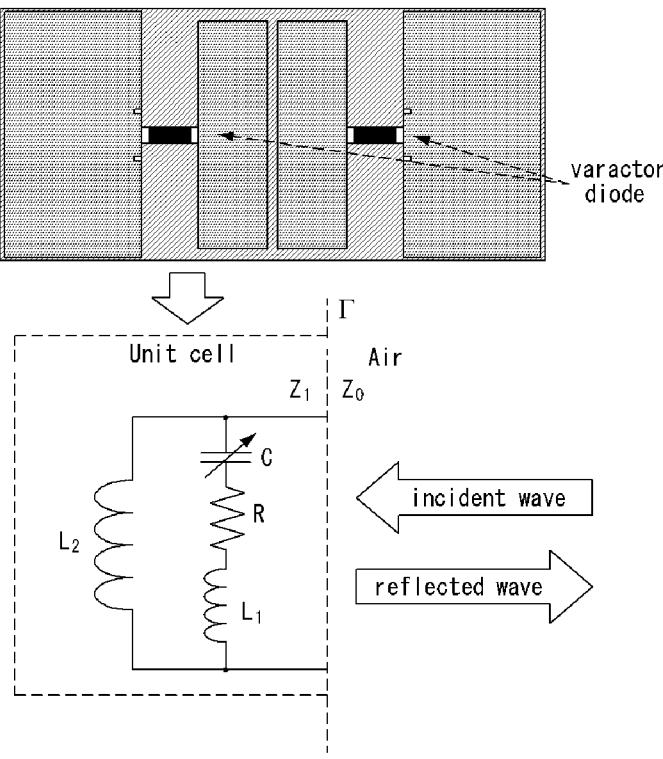

【FIG. 17】
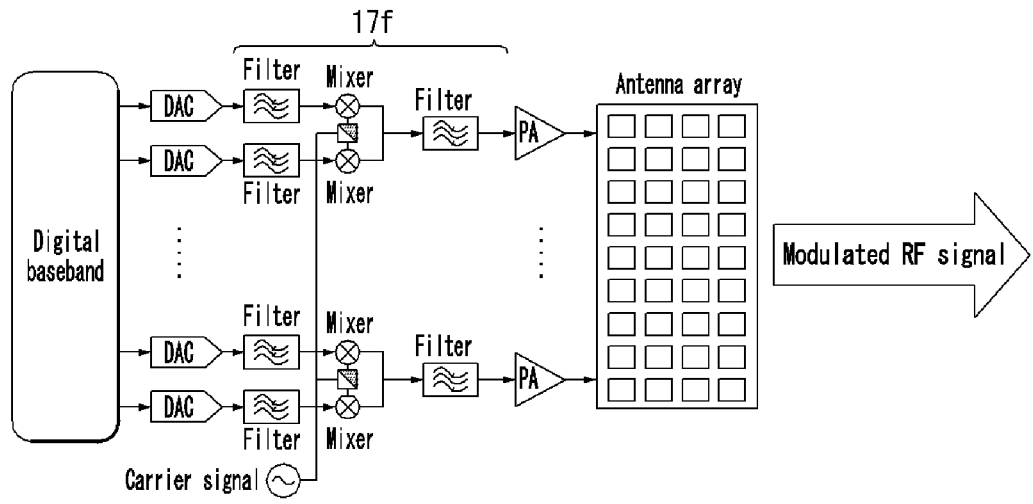
【FIG. 18】
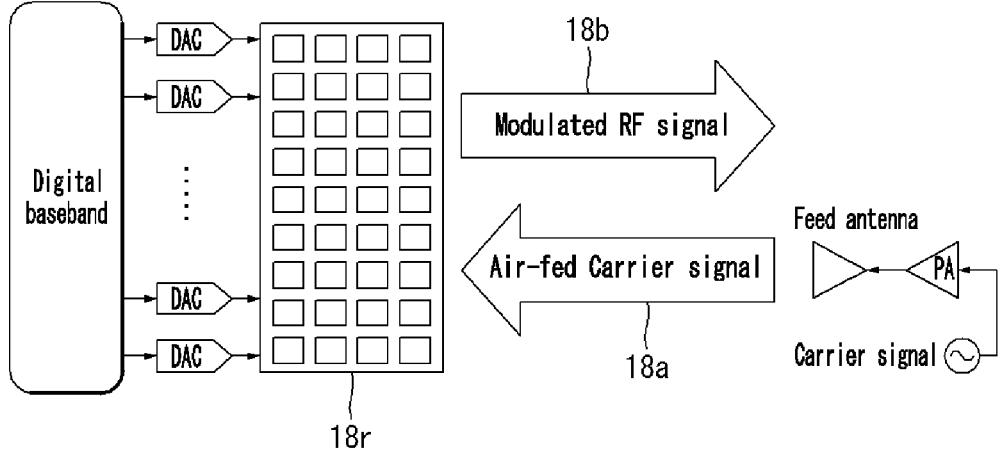

【FIG. 19】
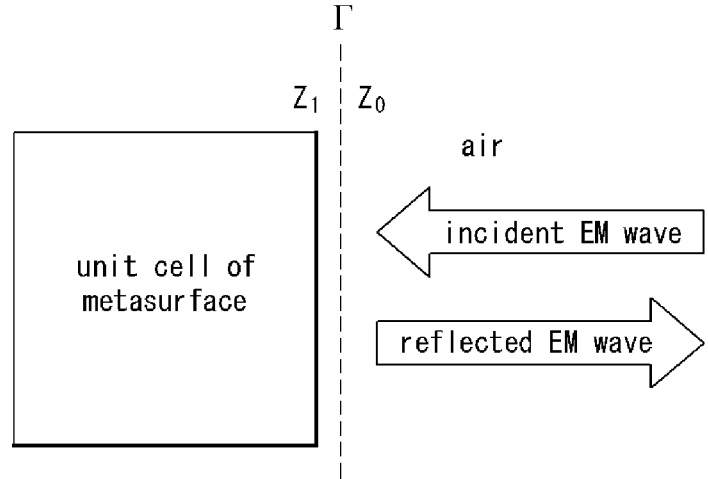
【FIG. 20】
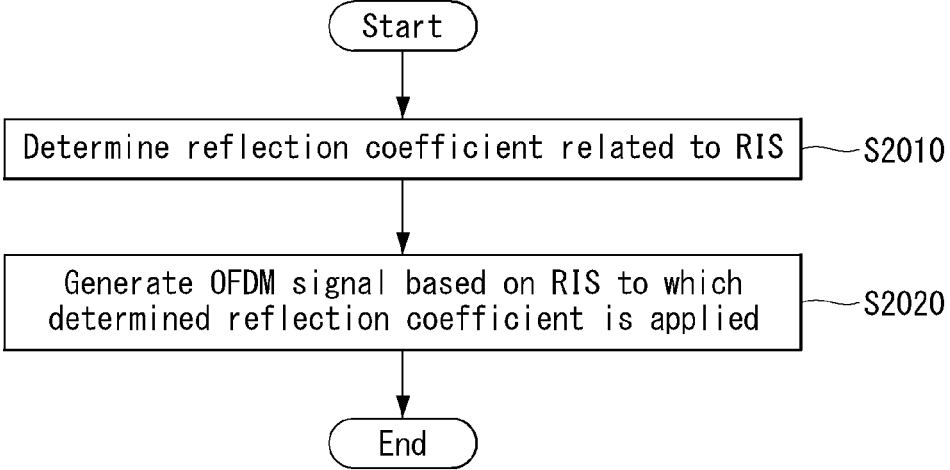

1

METHOD FOR TRANSMITTING ORTHOGONAL FREQUENCY DIVISION MULTIPLEXING SIGNAL ON BASIS OF RIS IN WIRELESS COMMUNICATION SYSTEM, AND DEVICE THEREFOR

CROSS-REFERENCE TO RELATED APPLICATION(S)

This application is the National Stage filing under 35 U.S.C. 371 of International Application No. PCT/KR2021/010112, filed on Aug. 3, 2021, the contents of which is hereby incorporated by reference herein in its entirety.

TECHNICAL FIELD

The present disclosure relates to a method of transmitting an orthogonal frequency division multiplexing signal based on a reconfigurable intelligent surface (RIS) in a wireless communication system, and a device therefor.

BACKGROUND

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

SUMMARY

A transmitter includes an RF element such as a filter and a mixer. In the 6G system that utilizes high frequencies such as Terahertz, the difficulty of implementing the RF element increases. Hence, for a massive MIMO transmitter including multiple transmit antennas, implementation complexity further increases. In this regard, a method of implementing a transmitter using a reconfigurable intelligent surface (RIS) has been proposed.

However, the transmitter implemented based on the RIS has a limitation in that it can be used only on a single carrier and cannot be used to generate an orthogonal frequency division multiplexing (OFDM) signal.

The present disclosure provides a method of generating an OFDM signal based on an RIS The technical objects to be achieved by the present disclosure are not limited to those that have been described hereinabove merely by way of example, and other technical objects that are not mentioned can be clearly understood by those skilled in the art, to which the present disclosure pertains, from the following descriptions.

A method of a wireless device for transmitting an orthogonal frequency division multiplexing (OFDM) signal based on a reconfigurable intelligent surface (RIS) in a wireless communication system according to an embodiment of the present disclosure comprises determining a reflection coefficient related to the RIS, and generating the OFDM signal based on the RIS to which the determined reflection coefficient is applied.

The RIS includes one or more RISs.

The reflection coefficient is determined based on at least one of 1) a first coefficient, 2) a second coefficient, or 3) an inverse fast Fourier transform (IFFT) size of data related to the OFDM signal.

The first coefficient is a value determined based on the data related to the OFDM signal, a modulation scheme related to the data, and a subcarrier index related to the OFDM signal.

The second coefficient is a value determined based on a specific index related to the OFDM signal.

The specific index may represent a time sample related to the IFFT size.

The time sample may be related to an OFDM symbol or a cyclic prefix (CP).

The reflection coefficient related to the RIS may satisfy the following equation:

$$R(k, n) = \frac{X(k)e^{\frac{j2\pi kn}{N}}}{N}, n = N - P, \dots , N - 1 \qquad \text{[Equation]}$$

where R(k, n) is the reflection coefficient related to the RIS, k is the subcarrier index, n is the specific index, X(k) is the first coefficient, $$e^{\frac{j2\pi kn}{N}}$$

is the second coefficient, N is the IFFT size of the data related to the OFDM signal, and P is a length of the CP.

The reflection coefficient related to the RIS may include one or more reflection coefficients related to the one or more RISs.

Based on the one or more RISs including two or more RISs configured to each of subcarriers related to the OFDM signal, the same reflection coefficient may be applied to the two or more RISs configured to each of the subcarriers related to the OFDM signal.

Based on the OFDM signal being related to a plurality of antennas of the wireless device, the reflection coefficient may be determined based on at least one of 1) the first coefficient, 2) the second coefficient, 3) the IFFT size of the data related to the OFDM signal, or 4) a precoding vector related to the plurality of antennas.

The reflection coefficient related to the RIS may be determined for each of the plurality of antennas.

The reflection coefficient related to the RIS may satisfy the following equation:

$$R_p(k, n) = \frac{v_p(k)X(k)e^{\frac{j2\pi kn}{N}}}{N}, n = N - P, \dots , N - 1 \qquad \text{[Equation]}$$

where $R_p(k, n)$ is the reflection coefficient related to the RIS, k is the subcarrier index, n is the specific index, p is an antenna index, X(k) is the first coefficient, $$e^{\frac{j2\pi kn}{N}}$$

is the second coefficient, N is the IFFT size of the data related to the OFDM signal, P is a length of a cyclic prefix (CP), and $v_p(k)$ is the precoding vector.

A wireless device transmitting an orthogonal frequency division multiplexing (OFDM) signal based on a reconfigurable intelligent surface (RIS) in a wireless communication system according to another embodiment of the present disclosure comprises one or more transceivers including the RIS, the one or more transceivers including a reflection coefficient setting unit configured to set a reflection coefficient applied to the RIS, one or more processors configured to control the one or more transceivers, and one or more memories operably connectable to the one or more processors, wherein the one or more memories are configured to store instructions that allow the one or more processors to perform operations based on being executed by the one or more processors.

The operations comprise determining the reflection coefficient related to the RIS, and generating the OFDM signal based on the RIS to which the determined reflection coefficient is applied.

The RIS includes one or more RISs.

The reflection coefficient is determined based on at least one of 1) a first coefficient, 2) a second coefficient, or 3) an inverse fast Fourier transform (IFFT) size of data related to the OFDM signal.

The first coefficient is a value determined based on the data related to the OFDM signal, a modulation scheme related to the data, and a subcarrier index related to the OFDM signal.

The second coefficient is a value determined based on a specific index related to the OFDM signal.

The wireless device may be a base station (BS) or a user equipment (UE).

A device according to another embodiment of the present disclosure comprises one or more memories, and one or more processors operably connected to the one or more memories. The one or more memories are configured to store instructions that allow the one or more processors to perform operations based on being executed by the one or more processors.

The operations comprise determining a reflection coefficient related to a reconfigurable intelligent surface (RIS), and generating an orthogonal frequency division multiplexing (OFDM) signal based on the RIS to which the determined reflection coefficient is applied.

The RIS includes one or more RISs.

The reflection coefficient is determined based on at least one of 1) a first coefficient, 2) a second coefficient, or 3) an inverse fast Fourier transform (IFFT) size of data related to the OFDM signal.

The first coefficient is a value determined based on the data related to the OFDM signal, a modulation scheme related to the data, and a subcarrier index related to the OFDM signal.

The second coefficient is a value determined based on a specific index related to the OFDM signal.

One or more non-transitory computer readable mediums according to another embodiment of the present disclosure store one or more instructions. The one or more instructions are configured to allow one or more processors to perform operations based on being executed by the one or more processors, The operations comprise determining a reflection coefficient related to a reconfigurable intelligent surface (RIS), and generating an orthogonal frequency division multiplexing (OFDM) signal based on the RIS to which the determined reflection coefficient is applied.

The RIS includes one or more RISs.

The reflection coefficient is determined based on at least one of 1) a first coefficient, 2) a second coefficient, or 3) an inverse fast Fourier transform (IFFT) size of data related to the OFDM signal.

The first coefficient is a value determined based on the data related to the OFDM signal, a modulation scheme related to the data, and a subcarrier index related to the OFDM signal.

The second coefficient is a value determined based on a specific index related to the OFDM signal.

According to embodiments of the present disclosure, an OFDM signal is generated using an RIS to which a determined reflection coefficient is applied. The reflection coefficient is determined based on at least one of 1) a first coefficient, 2) a second coefficient, or 3) an inverse fast Fourier transform (IFFT) size of data related to the OFDM signal. The first coefficient is a value determined based on the data related to the OFDM signal, a modulation scheme related to the data, and a subcarrier index related to the OFDM signal.

Embodiments of the present disclosure can generate the OFDM signal by adjusting the reflection coefficient of the RIS, and thus can obtain the following effects.

1) As the RIS is utilized, the existing RF element (mixer, filter, etc.) is not required to implement a transmitter. Since the implementation of a transmitter supporting high frequencies can be further simplified, implementation problems in supporting the terahertz frequency band can be resolved. 2) In the related art, the number of carriers supported by a transmitter implemented based on the RIS has been limited to one. However, according to embodiments of the present disclosure, a multi-carrier signal (OFDM signal) can be supported by adjusting the reflection coefficient of the RIS.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 1 illustrates an example of a communication system applicable to the present disclosure.

FIG. 2 illustrates an example of a wireless apparatus applicable to the present disclosure.

FIG. 3 illustrates a method of processing a transmitted signal applicable to the present disclosure.

FIG. 4 illustrates another example of a wireless device applicable to the present disclosure.

FIG. 5 illustrates an example of a hand-held device applicable to the present disclosure.

FIG. 6 illustrates physical channels applicable to the present disclosure and a signal transmission method using the same.

FIG. 7 illustrates the structure of a radio frame applicable to the present disclosure.

FIG. 8 illustrates a slot structure applicable to the present disclosure.

FIG. 9 illustrates an example of a communication structure providable in a 6G system applicable to the present disclosure.

FIG. 10 illustrates the configuration of a known MIMO communication system.

FIG. 11 illustrates a channel from a plurality of transmission antennas to a single reception antenna.

FIG. 12 is a diagram for describing a basic concept of codebook based precoding in a wireless communication system to which the present disclosure may be applied.

FIG. 13 illustrates a model for analyzing power of a received signal to which a method according to an embodiment of the present disclosure is applicable.

FIG. 14 illustrates a model of a wireless communication system for analyzing an error performance of a received signal to which a method according to an embodiment of the present disclosure is applicable.

FIG. 15 illustrates configuration of a resonator related to reconfigurable intelligent surface (RIS) implementation according to an embodiment of the present disclosure.

FIG. 16 illustrates configuration of a varactor diode related to RIS implementation according to an embodiment of the present disclosure.

FIG. 17 illustrates a transmitter including a plurality of transmit antennas.

FIG. 18 illustrates a transmitter implemented based on an RIS according to an embodiment of the present disclosure.

FIG. 19 illustrates a resonant tank model of an RIS according to an embodiment of the present disclosure.

FIG. 20 is a flow chart illustrating a method for a wireless device to transmit an orthogonal frequency division multiplexing signal based on RIS in a wireless communication system according to an embodiment of the present disclosure.

DETAILED DESCRIPTION

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.
Communication System Applicable to the Present Disclosure Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.
Communication System Applicable to the Present Disclosure FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204*a*. The memory 204*a* may be connected with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be connected with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be connected with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be connected with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be connected with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be connected with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be connected with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

FIG. 3 is a view showing a method of processing a transmitted signal applicable to the present disclosure. For example, the transmitted signal may be processed by a signal processing circuit. At this time, a signal processing circuit 300 may include a scrambler 310, a modulator 320, a layer mapper 330, a precoder 340, a resource mapper 350, and a signal generator 360. At this time, for example, the operation/function of FIG. 3 may be performed by the processors 202a and 202b and/or the transceiver 206a and 206b of FIG. 2. In addition, for example, the hardware element of FIG. 3 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 310 to 350 may be implemented in the processors 202a and 202b of FIG. 2 and a block 360 may be implemented in the transceivers 206a and 206b of FIG. 2, without being limited to the above-described embodiments.

A codeword may be converted into a radio signal through the signal processing circuit 300 of FIG. 3. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 6. Specifically, the codeword may be converted into a bit sequence scrambled by the scrambler 310. The scramble sequence used for scramble is generated based in an initial value and the initial value may include ID information of a wireless device, etc. The scrambled bit sequence may be modulated into a modulated symbol sequence by the modulator 320. The modulation scheme may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 330. Modulation symbols of each transport layer may be mapped to corresponding antenna port(s) by the precoder 340 (precoding). The output z of the precoder 340 may be obtained by multiplying the output y of the layer mapper 330 by an N*M precoding matrix W. Here, N may be the number of antenna ports and M may be the number of transport layers. Here, the precoder 340 may perform precoding after transform precoding (e.g., discrete Fourier transform (DFT)) for complex modulation symbols. In addition, the precoder 340 may perform precoding without performing transform precoding.

The resource mapper 350 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 360 may generate a radio signal from the mapped modulation symbols, and the generated radio signal may be transmitted to another device through each antenna. To this end, the signal generator 360 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 310 to 360 of FIG. 3. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Structure of Wireless Device Applicable to the Present Disclosure

FIG. 4 is a view showing another example of a wireless device applicable to the present disclosure.

Referring to FIG. 4, a wireless device 400 may correspond to the wireless devices 200a and 200b of FIG. 2 and include various elements, components, units/portions and/or modules. For example, the wireless device 400 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202a and 202b and/or one or more memories 204a and 204b of FIG. 2. For example, the transceiver(s) 414 may include one or more transceivers 206a and 206b and/or one or more antennas 208a and 208b of FIG. 2. The control unit 420 may be electrically connected with the communication unit 410, the memory unit 430 and the additional components 440 to control overall operation of the wireless device. For example, the control unit 420 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 1, 100*a*), the vehicles (FIG. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 430 or 440) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

FIG. 5 is a view showing an example of a hand-held device applicable to the present disclosure.

FIG. 5 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 500 may include an antenna unit (antenna) 508, a communication unit (transceiver) 510, a control unit (controller) 520, a memory unit (memory) 530, a power supply unit (power supply) 540*a*, an interface unit (interface) 540*b*, and an input/output unit 540*c*. An antenna unit (antenna) 508 may be part of the communication unit 510. The blocks 510 to 530/540*a* to 540*c* may correspond to the blocks 410 to 430/440 of FIG. 4, respectively.

The communication unit 510 may transmit and receive signals (e.g., data, control signals, etc.) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 500. In addition, the memory unit 530 may store input/output data/information, etc. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 540*c* may receive or output video information/signals, audio information/signals, data and/or user input information. The input/output unit 540*c* may include a camera, a microphone, a user input unit, a display 540*d*, a speaker and/or a haptic module.

For example, in case of data communication, the input/output unit 540*c* may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 440*c* in various forms (e.g., text, voice, image, video and haptic).

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

FIG. 6 is a view showing physical channels applicable to the present disclosure and a signal transmission method using the same.

The UE which is turned on again in a state of being turned off or has newly entered a cell performs initial cell search operation in step S611 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. The UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

FIG. 7 is a view showing the structure of a radio frame applicable to the present disclosure.

UL and DL transmission based on an NR system may be based on the frame shown in FIG. 7. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\,\mu}$ | $N_{slot}^{subframe,\,\mu}$ |
|---|---|---|---|
| 2 | 12 | 40 | 4 |

In Tables 1 and 2 above, $N_{symb}^{slot}$ may indicate the number of symbols in a slot, $N_{slot}^{frame,\mu}$ may indicate the number of slots in a frame, and $N_{slot}^{subframe,\mu}$ may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments.

FIG. 8 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| Per device peak data rate | 1 Tbps |
| EZE latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

FIG. 9 is a view showing an example of a communication structure providable in a 6G system applicable to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Terahertz (THz) Communication

THz communication is applicable to the 6G system. For example, a data rate may increase by increasing bandwidth. This may be performed by using sub-TH communication with wide bandwidth and applying advanced massive MIMO technology.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 10 shows the configuration of a known MIMO communication system.

Referring to FIG. 10, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 10, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$S = \left[ S_1, S_2, \dots, S_{N_T} \right]^T \qquad \text{[Equation 2]}$$

Transmission power may be different in each of pieces of transmission information s_1, s_2, . . . , s_NT In this case, if pieces of transmission power are P_1, P_2, . . . , P_NT, transmission information having controlled transmission power may be represented using the following vector.

$$\hat{s} = \left[ \hat{s}_1, \hat{s}_2, \dots, \hat{s}_{N_T} \right]^T = \left[ P_1 s_1, P_2 s_2, \dots, P_{N_T} s_{N_T} \right]^T \qquad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

The information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In this case, w_ij denotes weight between the i-th transmission antenna and the j-th transmission information, and W is an expression of a matrix of the weight. Such a matrix W is called a weight matrix or precoding matrix.

The transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If NR reception antennas are present, the reception signals y_1, y_2, . . . , y_NR of the respective antennas are represented as follows using a vector y.

$$y = \begin{bmatrix} y_1, y_2, \ldots, y_{N_R} \end{bmatrix}^T \qquad \text{[Equation 6]}$$

If channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 11 is a diagram showing a channel from a plurality of transmission antennas to a single reception antenna.

As shown in FIG. 11, a channel from a total of N_T transmission antennas to a reception antenna i may be represented as follows.

$$h_i^T = \begin{bmatrix} h_{i1}, h_{i2}, \ldots, h_{iN_T} \end{bmatrix} \qquad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \qquad \text{[Equation 8]}$$

An additive white Gaussian noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = \begin{bmatrix} n_1, n_2, \ldots, n_{N_R} \end{bmatrix}^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_T} \end{bmatrix} =$$

$$\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_T} \end{bmatrix} = Hx + n$$

[Equation 10]

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \le \min(N_T, N_R) \qquad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in association with the MIMO transmission techniques described above, a codebook based precoding technique will be described in more detail.

FIG. 12 is a diagram for describing a basic concept of codebook based precoding in a wireless communication system to which the present disclosure may be applied.

According to the codebook based precoding technique, the transmitting side an the receiving side share codebook information including a predetermined number of precoding matrixes according to a transmission rank, the number of antennas, and the like.

That is, when feedback information is infinite, the codebook based precoding technique may be used.

The receiving side measures the channel state through the received signal to feed back an infinite number of preferred precoding matrix information (that is, an index of the corresponding precoding matrix) to the transmitting side based on the codebook information. For example, the receiving side measures the received signal by a maximum likelihood (ML) or minimum mean square error (MMSE) technique to select the optimal precoding matrix.

It is illustrated that the receiving side transmits to the transmitting side the precoding matrix information for each codeword in FIG. 12, but the present disclosure need not be limited thereto.

The transmitting side that receives the feedback information from the receiving side may select a specific precoding matrix from the codebook based on the received information. The transmitting side that selects the precoding matrix may perform the precoding by a method that multiplies layer signals of a number corresponding to the transmission rank by the selected precoding matrix and transmit the transmitted signal of which precoding is performed through a plurality of antennas. In the precoding matrix, the number of rows is the same as the number of antennas and the number of columns is the same as a rank value. Since the rank value is the same as the number of layers, the number of columns is the same as the number of layers. For example, when the number of transmission antennas is 4 and the number of transmission layers is 2, the precoding matrix may be configured by a 4×2 matrix. Equation 12 below shows an operation of mapping information mapped to each layer to each antenna through the precoding matrix in such a case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix} \qquad \text{[Equation 12]}$$

Referring to Equation 12, the information mapped to the layer is x_1 and x_2 and each element P_ij of the 4×2 matrix is a weight used for precoding. y_1, y_2, y_3, and y_4 which are information mapped to the antennas may be transmitted through the respective antennas using respective OFDM transmission schemes.

The receiving side that receives the signal precoded and transmitted by the transmitting side performs inverse processing of the precoding performed by the transmitting side to restore the received signal. In general, the precoding matrix satisfies a unitary matrix (U) condition such as U·U^H=I (here, U^H represents a matrix of matrix U), therefore, the inverse processing of the precoding may be performed by multiplying the received signal by Hermit matrix P^H of the precoding matrix P used for the precoding of the transmitting side.

Further, since the precoding is required to have good performance for various schemes of antenna configurations, it is necessary to consider the performance of various antenna configurations in a codebook design. Hereinafter, an exemplary configuration of multiple antennas will be described.

In the existing 3GPP LTE system (for example, a system according to the 3GPP LTE Release-8 or 9 standard), up to 4 transmission antennas are supported in the downlink, and as a result, a codebook for 4 transmission antennas is designed. The 3GPP LTE-A system, which is an evolution of the existing 3GPP LTE, may support up to 8 transmission antennas in the downlink. Therefore, it is required to design a precoding codebook that provides good performance for downlink transmission over up to 8 transmission antennas.

Further, in the codebook design, it is generally required to provide good performance for a constant modulus property, infinite alphabet, constraint on a codebook size, a nested property, and various antenna configurations.

The constant modulus property means a property in which an amplitude of each channel component of the precoding matrix constituting the codebook is constant. According to such a property, regardless of which precoding matrix is used, power levels transmitted from all antennas, respectively may be kept to be the same as each other. Thus, the efficiency of use of a power amplifier may be increased.

The infinite alphabet means, for example, that in the case of two transmission antennas, the precoding matrices are configured by using only a quadrature phase shift keying (QPSK) alphabet (i.e., ±1, ±j) except for a scaling factor. Thus, complexity of computation may be mitigated in multiplication of the precoding matrix by the precoder.

The codebook size may be constrained to a predetermined size or less. As the size of the codebook increases, the precoding matrices for various cases may be included, and as a result, the channel state may be more accurately reflected, but the number of bits of a precoding matrix indicator (PMI) increases, which may cause signaling overhead.

The nested property means that a part of a high-rank precoding matrix is configured by a low-rank precoding matrix. When the precoding matrix is configured as such, proper performance may be ensured even when the ENB determines to perform downlink transmission at a transmission rank lower than a channel rank indicated by a rank indicator (RI) reported from the UE. Further, according to such a property, the complexity of Channel Quality Information (CQI) computation may be reduced. The reason is that at the time of performing an operation of selecting the precoding matrix among precoding matrices designed for different ranks, a part of computation for selecting the precoding matrix may be shared.

Providing the good performance for various antenna configurations means that it is required to provide performance of a predetermined criterion or higher for various cases including an antenna configuration having a low correlation, an antenna configuration having a high correlation, or a cross-polarized antenna configuration.

The contents described above can be applied by being combined with methods to be described later in the present disclosure, or can be supplemented to clarify technical features of methods described in the present disclosure. Methods to be described below are distinguished merely for convenience of description. Therefore, it is obvious that partial configuration of any one method can be replaced by partial configuration of another method, or methods can be combined and applied.

A propagation model related to two rays is described below.

Two-Ray Propagation Model

When a path between physically distant transmit and receive signals includes a line-of-sight (LoS) path and a reflected path on the ground surface, an influence on received power of the signal may be analyzed as follows.

FIG. 13 illustrates a model for analyzing power of a received signal to which a method according to an embodiment of the present disclosure is applicable.

In FIG. 13, d denotes a distance between a transmitter and a receiver, l denotes a distance between a transmit (Tx) antenna and a receive (Rx) antenna, $h_t$ denotes a height of the Tx antenna, $h_r$ denotes a height of the Rx antenna, $r_1$ denotes a distance between the Tx antenna and the ground surface where the reflection occurred, and $r_2$ denotes a distance between the Rx antenna and the ground surface where the reflection occurred.

In this instance, a received signal may be expressed as in Equation 13 below.

$$r(t) = \frac{\lambda}{2\pi} \left( \frac{e^{-\frac{j2\pi l}{\lambda}}}{l} + \frac{Re^{-\frac{j2\pi(r_1+r_2)}{\lambda}}}{r_1+r_2} \right) x(t) \qquad \text{[Equation 13]}$$

where x(t) is a transmit signal, $\lambda$ is a wavelength, and R is a reflection coefficient of the ground surface. Based on the Equation 13, power of the received signal may be expressed as Equation 14 below.

$$P_r = P_t \left(\frac{\lambda}{2\pi}\right)^2 \left| \frac{1}{l} + \frac{Re^{-j\Delta\phi}}{r_1+r_2} \right|^2 \qquad \text{[Equation 14]}$$

where $P_t$ is the transmit signal power, $$\Delta\phi = \frac{2\pi(r_1+r_2-l)}{\lambda}.$$

Assuming that d is sufficiently larger than the heights of the Tx and Rx antennas (e.g., d>>$h_t$+$h_r$), d≈l≈$r_1$+$r_2$ and R≈−1. Under this assumption, the power of the received signal may be approximated as follows.

First, if $\Delta d = r_1 + r_2 - l$ is defined, $\Delta d$ may be expressed as Equation 15 below.

$$\Delta d = r_1 + r_2 - l = \sqrt{(h_t+h_r)^2 + d^2} - \sqrt{(h_t-h_r)^2 + d^2} = \qquad \text{[Equation 15]}$$
$$d\left( \sqrt{1+\left(\frac{h_t+h_r}{d}\right)^2} - \sqrt{1+\left(\frac{h_t-h_r}{d}\right)^2} \right)$$

If the Equation 15 and Taylor series $$\left( \sqrt{1+x} = 1 + \frac{1}{2}x - \frac{1}{8}x^3 + \dots \approx 1 + \frac{1}{2}x \right)$$

are used, $\Delta d$ may be expressed as Equation 16 below.

$$\Delta d = d\left( 1 + \frac{1}{2}\left(\frac{h_t-h_r}{d}\right)^2 - 1 - \frac{1}{2}\left(\frac{h_t-h_r}{d}\right)^2 \right) = \frac{2h_t h_r}{d} \qquad \text{[Equation 16]}$$

Also, in the same way, $\Delta\phi$ may be expressed as Equation 17 below.

$$\Delta\phi = \frac{2\pi(r_1+r_2-l)}{\lambda} = \frac{4\pi h_t h_r}{\lambda d} \qquad \text{[Equation 17]}$$

If Taylor series $$\left( e^x = 1 + x + \frac{x^2}{2} + \frac{x^3}{3!} + \dots \approx 1 + x \right)$$

is used, power of the received signal may be expressed as Equation 18 below.

$$P_r = P_t \left(\frac{\lambda}{2\pi}\right)^2 \left| \frac{1}{l} + \frac{Re^{-j\Delta\phi}}{r_1+r_2} \right|^2 \approx P_t \left(\frac{\lambda}{2\pi d}\right)^2 |1-e^{-j\Delta\phi}|^2 = P_t \left(\frac{\lambda}{2\pi d}\right)^2 |1-1+j\Delta\phi|^2 \qquad \text{[Equation 18]}$$
$$= P_t \left(\frac{\lambda}{2\pi d}\right)^2 (\Delta\phi)^2 = P_t \left(\frac{\lambda}{2\pi d}\frac{4\pi h_t h_r}{\lambda d}\right)^2 = P_t \frac{4h_t^2 h_r^2}{d^4} \propto P_t \left(\frac{1}{d}\right)^4$$

For reference, if there is no reflected signal, the power of the received signal is $$P_r \propto P_t \left(\frac{1}{d}\right)^2,$$

i.e., inversely proportional to the square of the distance between the transmitter and the receiver. That is, it can be seen from the analysis of Equation 18 that even if there is only one reflected signal, the power of the received signal is inversely proportional to the fourth power of the distance between the transmitter and the receiver, resulting in much greater power attenuation.

The reconfigurable intelligent surface is described in detail below.

Reconfigurable Intelligent Surface (RIS)

The RIS is a plate-shaped element made of an electromagnetic (EM) material. Because the RIS can be controlled electronically, it is expected to be highly utilized in a wireless communication field. In general, it is difficult to artificially control a wireless communication environment, but the RIS opens the possibility of controlling the wireless environment. Ultimately, control of the wireless communication environment can be achieved through the use of the RIS.

The biggest advantage of the RIS is that a radio wave environment can be changed as desired to improve the quality of the received signal.

The main characteristics of the RIS are as follows.

Since the RIS is a passive element, it does not require an energy source such as a power supply device.

The RIS is a continuous plate-shaped element that can make and reflect all waveforms coming into the RIS into a desired shape.

Since the RIS does not require an analog-to-digital converter (ADC)/digital-to-analog converter (DAC), it has no impact on receiver noise.

Because the RIS does not have a specific operating frequency, it can be used over the entire available band.

The RIS can be easily deployed. For example, the RIS can be operated by simply attaching it to the exterior wall of a building, an indoor ceiling, a wall or ceiling of a factory, or human clothing.

The RIS may be referred to as the LIS described above. However, embodiments of the present disclosure to be described below are not limited to the RIS or the LIS and can also be applied to a surface acting as a reconfigurable reflector with passive elements as an artificial surface made of electromagnetic materials.

In the propagation model of FIG. 13, the ground surface may be changed to the RIS to analyze the power of the received signal. For the RIS, a reflection coefficient R may be adjusted to maximize the power of the received signal. If there is one RIS, when $R=e^{j\Delta\phi}$, the power of the received signal may be expressed as Equation 19 below.

$$P_r = P_t \left(\frac{\lambda}{2\pi}\right)^2 \left|\frac{1}{l} + \frac{1}{r_1 + r_2}\right|^2 = P_t \left(\frac{\lambda}{\pi d}\right)^2 \propto P_t \left(\frac{1}{d}\right)^2 \qquad \text{[Equation 19]}$$

It can be seen from the Equation 19 that the power of the received signal is inversely proportional to the square of the distance by appropriately adjusting the reflection coefficient of the RIS. That is, power attenuation resulting from signal reflection can be minimized by adjusting the reflection coefficient of the RIS. In other words, the power of the received signal may be adjusted to be equal to the received signal power when there is no reflected path (LoS environment).

If N RISs are present, the power of the received signal may be expressed as Equation 20 below.

$$P_r = P_t \left(\frac{\lambda}{2\pi}\right)^2 \left|\frac{1}{l} + \sum_{i=1}^{N} \frac{R_i e^{-j\Delta\phi_i}}{r_{1,i} + r_{2,i}}\right|^2 \qquad \text{[Equation 20]}$$

If the reflection coefficient of the i-th RIS is adjusted as $R_i=e^{j\Delta\phi_i}$, the power of the received signal may be expressed as Equation 21 below.

$$P_r = P_t(N+1)^2 \left(\frac{\lambda}{2\pi d}\right)^2 \propto P_t N^2 \left(\frac{1}{d}\right)^2 \qquad \text{[Equation 21]}$$

It can be seen from the equation 21 that the power of the received signal increases proportionally to the number of RISs.

If the wireless communication environment is controlled using the RIS, an impact on error performance may be analyzed as follows. This is described in detail below with reference to FIG. 14.

FIG. 14 illustrates a model of a wireless communication system for analyzing an error performance of a received signal to which a method according to an embodiment of the present disclosure is applicable.

Referring to FIG. 14, a wireless communication environment in which N RISs are present is assumed.

$h_i=\alpha_i e^{-j\theta_i}$ (i=1, . . . , N) is a channel from a transmitter S to the i-th RIS, and $g_i=\beta_i e^{-j\psi_i}$ (i=1, . . . , N) is a channel from the i-th RIS to a receiver D.

The reflection coefficient of the i-th RIS is $R_i=e^{j\Phi_i}$. In this instance, both $h_i$ and $g_i$ follow complex Gaussian distribution CN(0,1) that has a mean of 0 and a variance of 1.

In the system model of FIG. 14, the received signal r may be expressed as Equation 22 below.

$$r = \sum_{i=1}^{N} h_i e^{j\phi_i} g_i + n \qquad \text{[Equation 22]}$$

From the Equation 22, instantaneous SNR $\gamma$ may be expressed as Equation 23 below.

$$\gamma = \frac{\left|\sum_{i=1}^{N} \alpha_i \beta_i e^{j(\phi_i - \theta_i - \psi_i)}\right|^2 E_s}{N_0} \qquad \text{[Equation 23]}$$

where $E_s$ is transmission energy. If a phase of the reflection coefficient of the i-th RIS is set as $\phi_i=\theta_i+\psi_i$ to maximize the instantaneous SNR of the Equation 23, the instantaneous SNR may be expressed as Equation 24 below.

$$\gamma = \frac{\left|\sum_{i=1}^{N} \alpha_i \beta_i\right|^2 E_s}{N_0} = \frac{A^2 E_s}{N_0} \qquad \text{[Equation 24]}$$

where $$A = \sum_{i=1}^{N} \alpha_i \beta_i.$$

In this instance, since both $\alpha_i$ and $\beta_i$ are Rayleigh random variables, they may be expressed as $E[\alpha_i \beta_i] = \frac{\pi}{4}$ and $\text{Var}[\alpha_i \beta_i] = 1 - \frac{\pi^2}{16}$.

Assuming N is large enough, $$E[A] = \frac{N\pi}{4}$$

and

-continued $$Var[A] = N\left(1 - \frac{\pi^2}{16}\right)$$

based on central limit theorem.

Accordingly, the average SNR E[γ] may be expressed as Equation 25 below.

$$E[\gamma] = \frac{\left(N^2\pi^2 + N(16 - \pi^2)\right)E_s}{16N_0} \propto N^2\left(\frac{E_s}{N_0}\right) \qquad \text{[Equation 25]}$$

if $$N \gg 1$$

In this instance, the average symbol error probability assuming M-ary modulation is as follows. First, MPSK is expressed as Equations 26 and 27 below.

$$P_e \propto \exp\left(-\frac{N^2\pi^2 E_s}{16N_0}\right) \qquad \text{[Equation 26]}$$

for $$N\frac{E_s}{N_0} \ll 10$$

$$P_e \propto \left(\frac{N(16 - \pi^2)E_s}{8N_0}\right)^{-\frac{1}{2}}\exp\left(-\frac{N\pi^2}{2(16 - \pi^2)}\right) \qquad \text{[Equation 27]}$$

for $$N\frac{E_s}{N_0} \gg 1$$

In addition, MQAM may be expressed as Equation 28 below.

$$P_e \propto \exp\left(-\frac{3N^2\pi^2 E_s}{32(M - 1)N_0}\right) \qquad \text{[Equation 28]}$$

for $$N\frac{E_s}{N_0} \ll 10$$

Representative methods of implementing the RIS capable of controlling the wireless environment are described in detail below.

The first method is to turn a PIN diode on or off using an external bias. This method can pass or reflect electromagnetic (EM) waves through this operation. That is, an RIS device may be configured to pass the EM waves as it is when the PIN diode is turned off, and to reflect the EM waves when the PIN diode is turned on.

The second method is to utilize a resonator with two phase values (e.g., 0 and π). The shaping of a desired waveform is possible using multiple elements. FIG. 15 illustrates configuration of a resonator related to RIS implementation according to an embodiment of the present disclosure.

The third method is to utilize a varactor diode. Specifically, the reflection coefficient of the RIS can be adjusted by adjusting a capacitance of the varactor diode. This is described below with reference to FIG. 16.

FIG. 16 illustrates configuration of a varactor diode related to RIS implementation according to an embodiment of the present disclosure. Referring to FIG. 16, an impedance value, $$Z_1 = \frac{jwL_2\left(jwL_1 + \frac{1}{jwC} + R\right)}{jwL_2 + \left(jwL_1 + \frac{1}{jwC} + R\right)}$$

can be adjusted by adjusting a capacitance of the varactor diode using a bias voltage.

The fourth method is to utilize multiple electronic switches. Specifically, according to this method, various functions (e.g., absorption, beam steering, etc.) of an EM function are implemented by appropriately combining on-states and off-states of the electronic switches. In this instance, the electronic switches may be controlled through the software.

The fifth method is to use a liquid crystal. According to this method, a dielectric constant of the liquid crystal is changed by changing the DC voltage. When the dielectric constant changes, the effect of changing a phase shift value depending on a position within the RIS can be obtained. As described above, operations such as beam steering can be performed using changes in the phase shift value.

A method of generating an orthogonal frequency division multiplexing (OFDM) signal using the RIS is described below.

A structure of a transmitter according to the related art and a structure of a transmitter based on the RIS are first described with reference to FIGS. 17 and 18.

FIG. 17 illustrates a transmitter including a plurality of transmit antennas.

Referring to FIG. 17, in order to modulate user data into a carrier signal with a specific carrier frequency, the user data passes through a mixer and a filter 17f and then is input to a transmit (Tx) antenna. In this instance, the difficulty of implementing the mixer, the filter, etc. increases as the carrier frequency increases, and thus an efficient implementation method is required.

The transmitter can be implemented without the mixer or the filter by appropriately adjusting the reflection coefficient of the RIS. This is described below with reference to FIG. 18.

FIG. 18 illustrates a transmitter implemented based on the RIS according to an embodiment of the present disclosure. Specifically, FIG. 18 illustrates configuration of a transmitter implemented using the RIS without an RF element such as a mixer or a filter.

Referring to FIG. 18, a carrier signal 18a of a specific frequency is input to an RIS 18r. A modulation is performed through a reflection using the RIS 18r (18b).

Although not illustrated, the RIS 18r may include a unit (reflection coefficient setting unit) for setting a reflection coefficient. For example, the unit for setting the reflection coefficient may be implemented as a reflection coefficient setting unit and included in a transceiver (e.g., 206a/206b of FIG. 2) of a wireless device. As another example, when a wireless device includes a transmitter and a receiver as a separate component, the reflection coefficient setting unit may be included in the transmitter.

When control information is input, the reflection coefficient setting unit outputs a reflection coefficient of the RIS 18r based on the input control information to the RIS 18r.

That is, the reflection coefficient applied to the RIS 18r may be based on a signal output from the reflection coefficient setting unit. The reflection coefficient may be based on an embodiment to be described below (single transmit antenna, multiple transmit antennas). According to an embodiment, the control information may include at least one of i) user data, ii) OFDM related parameters (e.g., IFFT size, CP length), or iii) antenna setting (e.g., the number of antennas).

An operation of inputting the signal output from the reflection coefficient setting unit to the RIS 18r may be interpreted as an operation of applying the reflection coefficient determined based on the user data to the RIS.

An operation in which the modulation is performed through the reflection using the RIS 18r is described with reference to FIG. 19.

FIG. 19 illustrates a resonant tank model of the RIS according to an embodiment of the present disclosure. The RIS may be analyzed using a resonant tank model. Referring to FIG. 19, a reflection coefficient F may be expressed as Equation 29 below.

$$\Gamma = \frac{z_1 - z_0}{z_1 + z_0}$$ [Equation 29]

where $$Z_1 = \frac{jwL_2\left(jwL_1 + \frac{1}{jwC} + R\right)}{jwL_2 + \left(jwL_1 + \frac{1}{jwC} + R\right)}.$$

The reflection coefficient F may be set to a specific value by adjusting $Z_1$. The signal reflected from the RIS of FIG. 18 may be expressed as Equation 30 below.

$$E_r(t) = E_i(t)\,\Gamma(t)$$ [Equation 30]

where $E_r(t)$ is a reflected signal, $E_i(t)=A\cos(2\pi f_c t+\varphi_0)$ is an input signal, A is an amplitude, $f_c$ is a carrier frequency, and $\varphi_0$ is an initial phase value. If $E_r(t)$ of the Equation 30 is converted into a frequency domain, it may be expressed as Equation 31 below.

$$E_r(f) = A\left(\frac{e^{-j\varphi_0}\delta(f+f_c) + e^{j\varphi_0}\delta(f-f_c)}{2}\right) * \Gamma(f) =$$ [Equation 31]

$$A\left(\frac{e^{-j\varphi_0}\Gamma(f+f_c) + e^{j\varphi_0}\Gamma(f-f_c)}{2}\right)$$

where * denotes a convolution operation, and $\delta(\cdot)$ is a Dirac delta function. It can be seen from the Equation 31 that the frequency domain of the reflected signal is determined based on a spectrum of the reflection coefficient around the carrier frequency.

According to the Equation 31, if the reflection coefficient of the RIS is appropriately set based on the user data, the reflected signal through the RIS becomes the same as a signal in which the user data is modulated with a specific carrier signal.

For example, in order to modulate the user data into QPSK, the reflection coefficient may be set based on the user data as shown in Table 5 below. Setting the reflection coefficient as shown in Table 5 may be implemented using the method of changing the bias voltage of the varactor diode based on the user data among the previously mentioned RIS implementation methods.

TABLE 5

| User Data | Reflection Coefficient (R) |
|---|---|
| 00 | $e^{j\frac{\pi}{4}}$ |
| 01 | $e^{j\frac{3\pi}{4}}$ |
| 11 | $e^{j\frac{5\pi}{4}}$ |
| 10 | $e^{j\frac{7\pi}{4}}$ |

Embodiments of generating an OFDM signal using the RIS are described below. The embodiments are described by being divided into a case of single transmit antenna and a case of multiple transmit antennas.

Single Transmit Antenna

If user data is transmitted using an OFDM method, a transmit signal may be expressed as Equation 32 below. Specifically, as the user data is deployed on each subcarrier through a serial-to-parallel operation and then IFFT is performed, the user data is transmitted.

$$x(n) = \frac{1}{N}\sum_{k=0}^{N-1} X(k)e^{\frac{j2\pi kn}{N}}$$ [Equation 32]

where k is a subcarrier index, x(n) is a transmit signal at t=n, X(k) is user data, and N is IFFT size.

Referring to the Equation 32

$$\left\{ \frac{X(0)}{N},\ \frac{X(1)e^{\frac{j2\pi n}{N}}}{N},\ \dots,\ \frac{X(N-1)e^{\frac{j2\pi(N-1)n}{N}}}{N} \right\}$$

at a specific time t=n may be set to reflection coefficients of N RISs as in Equation 33.

$$R(k, n) = \frac{X(k)e^{\frac{j2\pi kn}{N}}}{N},$$ [Equation 33]

$$k = 0, 1, \dots, N-1$$

When a carrier signal of a specific frequency is input to the N RISs with the reflection coefficients set as in the Equation 33 as in the transmitter operation of FIG. 18, a reflected signal is input to a receiver in a superposition form as shown in the Equation 32. This is the same as performing an IFFT operation of the signal reflected by the RISs during the propagation process. The received signal may be expressed as Equation 34 below.

$$E_r(t) = \sum_{k=0}^{N-1} R(k, n)E_i(t) = \frac{1}{N}\sum_{k=0}^{N-1} X(k)e^{\frac{j2\pi kn}{N}}E_i(t)$$ [Equation 34]

The Equation 34 assumes that the user data placed on each subcarrier is reflected using one RIS. However, the present disclosure is not limited thereto, and the user data placed (assigned) on each subcarrier may be reflected using multiple RISs. In this instance, it is preferable that the multiple RISs used for the reflection of the user data placed on a specific subcarrier are set to the same reflection coefficient.

In order to prevent inter-symbol interference (ISI) when generating an OFDM signal, cyclic prefix (CP) is added.

According to a general CP generation method, a latter portion of a time domain signal of an IFFT output is copied to a front portion of the OFDM symbol. For example, if a CP length is assumed as P, $\{x(N-P), \ldots, x(N-1)\}$ in the IFFT output is copied to the front portion of the OFDM symbol. If the RIS is used, the CP may be generated by setting the reflection coefficient as in Equation 35 below.

$$R(k, n) = \frac{X(k)e^{\frac{j2\pi kn}{N}}}{N}, \quad \text{[Equation 35]}$$

$$n = N - P, \ldots, N - 1$$

Table 6 below shows an example of the reflection coefficient setting of the RIS for generating the OFDM signal when quadrature phase shift keying (QPSK) modulation is used, the CP length P is 2, and IFFT size (N) is 8 if the user data is $\{00101101\ 10010001\}$. If the QPSK modulation is assumed as $$\left\{ e^{\frac{j\pi}{4}}, e^{\frac{j3\pi}{4}}, e^{\frac{j5\pi}{4}}, e^{\frac{j7\pi}{4}} \right\}$$

for $\{00, 01, 11, 10\}$, $$X(0) = e^{\frac{j\pi}{4}}, X(1) = e^{\frac{j7\pi}{4}}, X(2) = e^{\frac{j5\pi}{4}}, X(3) = e^{\frac{j3\pi}{4}},$$

$$X(4) = e^{\frac{j7\pi}{4}}, X(5) = e^{\frac{j3\pi}{4}}, X(6) = e^{\frac{j\pi}{4}}, X(7) = e^{\frac{j3\pi}{4}}$$

for the user data $\{00101101\ 10010001\}$.

TABLE 6

| | Time index | Reflection Coefficient |
|---|---|---|
| CP | −2 | $R(k, -2) = R(k, 6) = \frac{1}{8}\left\{ e^{\frac{j\pi}{4}}, e^{\frac{j5\pi}{4}}, e^{\frac{j\pi}{4}}, e^{\frac{j5\pi}{4}}, e^{\frac{j7\pi}{4}}, e^{\frac{j\pi}{4}}, e^{\frac{j5\pi}{4}}, e^{\frac{j5\pi}{4}} \right\}$ |
| | −1 | $R(k, -1) = R(k, 7) = \frac{1}{8}\left\{ e^{\frac{j\pi}{4}}, e^{\frac{j6\pi}{4}}, e^{\frac{j3\pi}{4}}, e^{\frac{j0\pi}{4}}, e^{\frac{j3\pi}{4}}, e^{\frac{j6\pi}{4}}, e^{\frac{j3\pi}{4}}, e^{\frac{j4\pi}{4}} \right\}$ |
| OFDM Symbol | 0 | $R(k, 0) = \frac{1}{8}\left\{ e^{\frac{j\pi}{4}}, e^{\frac{j7\pi}{4}}, e^{\frac{j5\pi}{4}}, e^{\frac{j3\pi}{4}}, e^{\frac{j7\pi}{4}}, e^{\frac{j3\pi}{4}}, e^{\frac{j\pi}{4}}, e^{\frac{j3\pi}{4}} \right\}$ |
| | 1 | $R(k, 1) = \frac{1}{8}\left\{ e^{\frac{j\pi}{4}}, e^{\frac{j0\pi}{4}}, e^{\frac{j7\pi}{4}}, e^{\frac{j6\pi}{4}}, e^{\frac{j3\pi}{4}}, e^{\frac{j0\pi}{4}}, e^{\frac{j7\pi}{4}}, e^{\frac{j2\pi}{4}} \right\}$ |
| | 2 | $R(k, 2) = \frac{1}{8}\left\{ e^{\frac{j\pi}{4}}, e^{\frac{j\pi}{4}}, e^{\frac{j\pi}{4}}, e^{\frac{j\pi}{4}}, e^{\frac{j7\pi}{4}}, e^{\frac{j5\pi}{4}}, e^{\frac{j\pi}{4}}, e^{\frac{j\pi}{4}} \right\}$ |
| | 3 | $R(k, 3) = \frac{1}{8}\left\{ e^{\frac{j\pi}{4}}, e^{\frac{j2\pi}{4}}, e^{\frac{j3\pi}{4}}, e^{\frac{j4\pi}{4}}, e^{\frac{j3\pi}{4}}, e^{\frac{j2\pi}{4}}, e^{\frac{j7\pi}{4}}, e^{\frac{j0\pi}{4}} \right\}$ |
| | 4 | $R(k, 4) = \frac{1}{8}\left\{ e^{\frac{j\pi}{4}}, e^{\frac{j3\pi}{4}}, e^{\frac{j5\pi}{4}}, e^{\frac{j7\pi}{4}}, e^{\frac{j7\pi}{4}}, e^{\frac{j7\pi}{4}}, e^{\frac{j\pi}{4}}, e^{\frac{j7\pi}{4}} \right\}$ |
| | 5 | $R(k, 5) = \frac{1}{8}\left\{ e^{\frac{j\pi}{4}}, e^{\frac{j4\pi}{4}}, e^{\frac{j7\pi}{4}}, e^{\frac{j2\pi}{4}}, e^{\frac{j3\pi}{4}}, e^{\frac{j4\pi}{4}}, e^{\frac{j7\pi}{4}}, e^{\frac{j6\pi}{4}} \right\}$ |
| | 6 | $R(k, 6) = \frac{1}{8}\left\{ e^{\frac{j\pi}{4}}, e^{\frac{j5\pi}{4}}, e^{\frac{j\pi}{4}}, e^{\frac{j5\pi}{4}}, e^{\frac{j7\pi}{4}}, e^{\frac{j\pi}{4}}, e^{\frac{j5\pi}{4}}, e^{\frac{j5\pi}{4}} \right\}$ |
| | 7 | $R(k, 7) = \frac{1}{8}\left\{ e^{\frac{j\pi}{4}}, e^{\frac{j6\pi}{4}}, e^{\frac{j3\pi}{4}}, e^{\frac{j0\pi}{4}}, e^{\frac{j3\pi}{4}}, e^{\frac{j6\pi}{4}}, e^{\frac{j3\pi}{4}}, e^{\frac{j4\pi}{4}} \right\}$ |

In the Table 6, the time index denotes a time sample based on IFFT size(8). The reflection coefficient of each subcarrier may be applied to one RIS or multiple RISs.

The OFDM signal generated as above may be received in the same method as the existing method (e.g., reception through the conventional OFDM receiver).

Multiple Transmit Antennas

Assuming that the number of receiver antennas at a transmitter with multiple transmit antennas is 1, a transmit signal may be expressed as Equation 36 below.

$$x(n) = \begin{bmatrix} x_1(n) \\ \vdots \\ x_M(n) \end{bmatrix}, x_p(n) = \frac{1}{N}\sum_{k=0}^{N-1} v_p(k)X(k)e^{\frac{j2\pi kn}{N}} \quad \text{[Equation 36]}$$

where M is the number of transmit antennas, $x_p(n)$ is a transmit signal at a p-th antenna, and $$V(k) = \begin{bmatrix} v_1(k) \\ \vdots \\ x_M(n) \end{bmatrix}$$

is a precoding vector for a k-th subcarrier, where $v_p(k)$ is a p-th element of V(k), and X(k) is user data assigned to a k-th subcarrier. The precoding vector may be based on the precoding matrix described above with reference to FIGS. 10 to 12.

It can be seen from the Equation 36 that $$\left\{ \frac{v_p(0)X(0)}{N}, \frac{v_p(1)X(1)e^{\frac{j2\pi n}{N}}}{N}, \dots, \frac{v_p(N-1)X(N-1)e^{\frac{j2\pi(N-1)n}{N}}}{N} \right\}$$

may be set to the reflection coefficients of N RISs as in Equation 37 to generate the transmit signal of the p-th antenna at the specific time t=n.

$$R_p(k, n) = \frac{v_p(k)X(k)e^{\frac{j2\pi kn}{N}}}{N}, \qquad \text{[Equation 37]}$$

$$k = 0, 1, \dots, N-1, p = 1, \dots, M$$

When a carrier signal of a specific frequency is input to the N RISs with the reflection coefficients set as in the Equation 37 as in the transmitter operation of FIG. 18, a reflected signal is input to a receiver in a superposition form of the OFDM signal transmitted through the p-th antenna as shown in the Equation 36. This is the same as performing an IFFT operation of the signal reflected by the RISs during the propagation process. The received signal may be expressed as Equation 38 below.

$$E_r(t) = \sum_{k=0}^{N-1} R_p(k, n)E_i(t) = \frac{1}{N}\sum_{k=0}^{N-1} v_p(k)X(k)e^{\frac{j2\pi kn}{N}}E_i(t) \qquad \text{[Equation 38]}$$

A signal corresponding to the CP may be generated in the same method as the above-described single transmit antenna. For example, if a CP length is assumed as P, $\{x_p(N-P), \dots, x_p(N-1)\}$ in the IFFT output of the p-th antenna is copied to the front portion of the OFDM symbol. If the RIS is used, the CP may be generated by setting the reflection coefficient as in Equation 39 below.

$$R_p(k, n) = \frac{v_p(k)X(k)e^{\frac{j2\pi kn}{N}}}{N}, \qquad \text{[Equation 39]}$$

$$k = 0, 1, \dots, N-1, p = 1, \dots, M, n = N-P, \dots, N-1$$

There is an advantage in that if the Equations 37 and 38 are used, the OFDM signal transmitted through the multiple transmit antennas can be generated through the RIS and can be implemented as a single RF chain as illustrated in FIG. 18.

The OFDM signal generated as above may be received in the same method as the existing method (e.g., reception through the conventional OFDM receiver).

From an implementation prospective, operations according to the above-described embodiments (e.g., operations of generating the OFDM signal based on the RIS) can be processed by the device of FIGS. 1 to 5 (e.g., the processors 202a and 202b of FIG. 2).

Further, operations according to the above-described embodiments (e.g., operations of generating the OFDM signal based on the RIS) may be stored in a memory (e.g., the memories 204a and 204b of FIG. 2) in the form of commands/programs (e.g., instructions, executable codes) for running at least one processor (e.g., the processors 202a and 202b of FIG. 2).

Below, the above embodiments are described in detail in terms of operations of the wireless device (e.g., the first wireless device 200a and the second wireless device 200b of FIG. 2) with reference to FIG. 20. Methods described below are merely distinguished for convenience of explanation. Thus, it is obvious that partial configuration of any method can be substituted or combined with partial configuration of another method.

FIG. 20 is a flow chart illustrating a method for a wireless device to transmit an orthogonal frequency division multiplexing signal based on an RIS in a wireless communication system according to an embodiment of the present disclosure.

Referring to FIG. 20, a method for a wireless device to transmit an orthogonal frequency division multiplexing (OFDM) signal based on a reconfigurable intelligent surface (RIS) in a wireless communication system according to an embodiment of the present disclosure comprises a step S2010 of determining a reflection coefficient related to the RIS and a step S2020 of generating the OFDM signal using the RIS to which the determined reflection coefficient is applied.

In the step S2010, the wireless device determines the reflection coefficient related to the RIS.

According to an embodiment, the wireless device may be a base station (BS) or a user equipment (UE). For example, if the wireless device is the BS, the OFDM signal may be transmitted from the BS to the UE. For another example, if the wireless device is the UE, the OFDM signal may be transmitted from the UE to the BS.

According to an embodiment, the RIS may include one or more RISs.

According to an embodiment, the reflection coefficient may be determined based on at least one of 1) a first coefficient, 2) a second coefficient, or 3) an inverse fast Fourier transform (IFFT) size of data related to the OFDM signal. The present embodiment may be based on an implementation described in the single transmit antenna.

According to an embodiment, the first coefficient may be a value determined based on the data related to the OFDM signal, a modulation scheme related to the data, and a subcarrier index related to the OFDM signal.

According to an embodiment, the second coefficient may be a value determined based on a specific index related to the OFDM signal. The specific index may represent a time sample related to the IFFT size. The time sample may be related to an OFDM symbol or a cyclic prefix (CP).

According to an embodiment, the reflection coefficient related to the RIS may satisfy the following equation.

$$R(k, n) = \frac{X(k)e^{\frac{j2\pi kn}{N}}}{N}, n = N-P, \dots, N-1 \qquad \text{[Equation]}$$

where R(k, n) is the reflection coefficient related to the RIS, k is a subcarrier index, n is the specific index, X(k) is the first coefficient, $$e^{\frac{j2\pi kn}{N}}$$

is the second coefficient, N is the IFFT size of the data related to the OFDM signal, and P is a length of the CP.

According to an embodiment, the reflection coefficient related to the RIS may include one or more reflection coefficients related to the one or more RISs. For example, if the RIS is based on N RISs, the reflection coefficient related to the RIS may include N reflection coefficients. The present embodiment may be based on the Tables 3 and 4.

According to an embodiment, based on the one or more RISs including two or more RISs configured to each of subcarriers related to the OFDM signal, the same reflection coefficient may be applied to the two or more RISs configured to each of the subcarriers related to the OFDM signal. That is, the OFDM signal may be generated by reflecting user data assigned to each subcarrier through a plurality of RISs. In this case, the same reflection coefficient may be configured to be applied to the plurality of RISs used to reflect the user data assigned to a specific subcarrier.

According to an embodiment, based on the OFDM signal being related to a plurality of antennas of the wireless device, the reflection coefficient may be determined based on at least one of 1) the first coefficient, 2) the second coefficient, 3) the IFFT size of the data related to the OFDM signal, or 4) a precoding vector related to the plurality of antennas. The present embodiment may be based on an implementation described in the multiple transmit antennas.

The reflection coefficient related to the RIS may be determined for each of the plurality of antennas.

The reflection coefficient related to the RIS may satisfy the following equation.

$$R_p(k, n) = \frac{v_p(k)X(k)e^{\frac{j2\pi kn}{N}}}{N}, \, n = N - P, \dots, N - 1 \qquad \text{[Equation]}$$

where $R_p(k, n)$ is the reflection coefficient related to the RIS, k is a subcarrier index, n is the specific index, p is an antenna index, X(k) is the first coefficient, $$e^{\frac{j2\pi kn}{N}}$$

is the second coefficient, N is the IFFT size of the data related to the OFDM signal, P is a length of the CP, and $v_p(k)$ is the precoding vector.

According to the step S2010, an operation of the wireless device (e.g., 200a of FIG. 2) to determine the reflection coefficient related to the RIS may be implemented by a device of FIGS. 1 to 5. For example, referring to FIG. 2, one or more processors 202a may control one or more memories 204a and/or one or more transceivers 206a so as to determine the reflection coefficient related to the RIS.

In the step S2020, the wireless device generates the OFDM signal using the RIS to which the determined reflection coefficient is applied.

According to an embodiment, a transceiver of the wireless device may include the RIS. For example, the transceiver of the wireless device may include a transceiver configuration of FIG. 18. The transceiver of the wireless device may include a reflection coefficient setting unit. The reflection coefficient setting unit sets the reflection coefficient applied to the RIS.

Specifically, when control information is input, the reflection coefficient setting unit outputs a reflection coefficient based on the control information to the RIS. The reflection coefficient based on the above-described embodiment may be based on a signal output from the reflection coefficient setting unit. The reflection coefficient setting unit may be configured to output (the signal corresponding to) the reflection coefficient determined by the wireless device (processor) to the RIS. According to an embodiment, the control information may include at least one of i) user data, ii) OFDM related parameters (e.g., IFFT size, CP length), or iii) antenna setting (e.g., the number of antennas).

An operation of inputting the signal output from the reflection coefficient setting unit to the RIS may be interpreted as an operation of applying the determined reflection coefficient to the RIS.

According to the step S2020, an operation of the wireless device (e.g., 200a of FIG. 2) to generate the OFDM signal using the RIS to which the determined reflection coefficient is applied may be implemented by the device of FIGS. 1 to 5. For example, referring to FIG. 2, one or more processors 202a may control one or more memories 204a and/or one or more transceivers 206a so as to generate the OFDM signal using the RIS to which the determined reflection coefficient is applied.

Effects of a method and device for transmitting and receiving a physical downlink channel in a wireless communication system according to an embodiment of the present disclosure are described as follows.

According to embodiments of the present disclosure, the OFDM signal is generated using the RIS to which the determined reflection coefficient is applied. The reflection coefficient is determined based on at least one of 1) a first coefficient, 2) a second coefficient, or 3) an IFFT size of data related to the OFDM signal. The first coefficient is a value determined based on the data related to the OFDM signal, a modulation scheme related to the data, and a subcarrier index related to the OFDM signal.

Embodiments of the present disclosure can generate the OFDM signal by adjusting the reflection coefficient of the RIS, and thus can obtain the following effects.

1) As the RIS is utilized, the existing RF element (mixer, filter, etc.) is not required to implement the transmitter. Since the implementation of a transmitter supporting high frequencies can be further simplified, implementation problems in supporting the terahertz frequency band can be resolved. 2) In the related art, the number of carriers supported by a transmitter implemented based on the RIS has been limited to one. However, according to embodiments of the present disclosure, a multi-carrier signal (OFDM signal) can be supported by adjusting the reflection coefficient of the RIS.

Here, the wireless communication technology implemented in the device (200a/200b) of the present disclosure may include LTE, NR, and 6G as well as Narrowband Internet of Things (NB-IoT) for low-power communication. For example, the NB-IoT technology may be an example of a LPWAN (Low Power Wide Area Network) technology, and may be implemented in standards such as LTE Cat NB1 and/or LTE Cat NB2, and is not limited to the above-described name. Additionally or alternatively, the wireless communication technology implemented in the device (200a/200b) of the present disclosure may perform communication based on the LTE-M technology. For example, the LTE-M technology may be an example of LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or

39

7) LTE M, and is not limited to the above-described name. Additionally or alternatively, the wireless communication technology implemented in the device (200a/200b) of the present disclosure may include at least one of ZigBee, Bluetooth, and Low Power Wide Area Network (LPWAN) in consideration of low power communication, and is not limited to the above-described name. For example, the ZigBee technology may generate PAN (personal area networks) related to small/low-power digital communication based on various standards such as IEEE 802.15.4, and may be called by various names.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:
1. A method of a wireless device for transmitting an orthogonal frequency division multiplexing (OFDM) signal based on a reconfigurable intelligent surface (RIS) in a wireless communication system, the method comprising:
determining a reflection coefficient related to the RIS; and
generating the OFDM signal based on the RIS to which the determined reflection coefficient is applied,
wherein the RIS includes one or more RISs,
wherein the reflection coefficient is determined based on at least one of 1) a first coefficient, 2) a second coefficient, or 3) an inverse fast Fourier transform (IFFT) size of data related to the OFDM signal,
wherein the first coefficient is a value determined based on the data related to the OFDM signal, a modulation scheme related to the data, and a subcarrier index related to the OFDM signal, and
wherein the second coefficient is a value determined based on a specific index related to the OFDM signal.
2. The method of claim 1, wherein the specific index represents a time sample related to the IFFT size.
3. The method of claim 2, wherein the time sample is related to an OFDM symbol or a cyclic prefix (CP).
4. The method of claim 3, wherein the reflection coefficient related to the RIS satisfies the following equation:

$$R(k,n) = \frac{X(k)e^{\frac{j2\pi kn}{N}}}{N}, n = N-P, \ldots, N-1 \quad \text{[Equation]}$$

where R(k, n) is the reflection coefficient related to the RIS, k is the subcarrier index, n is the specific index, X(k) is the first coefficient, $$e^{\frac{j2\pi kn}{N}}$$

is the second coefficient, N is the IFFT size of the data related to the OFDM signal, and P is a length of the CP.
5. The method of claim 1, wherein the reflection coefficient related to the RIS includes one or more reflection coefficients related to the one or more RISs.
6. The method of claim 5, wherein, based on the one or more RISs including two or more RISs configured to each of subcarriers related to the OFDM signal, the same reflection coefficient is applied to the two or more RISs configured to each of the subcarriers related to the OFDM signal.
7. The method of claim 1, wherein, based on the OFDM signal being related to a plurality of antennas of the wireless device,
the reflection coefficient is determined based on at least one of 1) the first coefficient, 2) the second coefficient, 3) the IFFT size of the data related to the OFDM signal, or 4) a precoding vector related to the plurality of antennas.
8. The method of claim 7, wherein the reflection coefficient related to the RIS is determined for each of the plurality of antennas.
9. The method of claim 8, wherein the reflection coefficient related to the RIS satisfies the following equation:

$$R_p(k,n) = \frac{v_p(k)X(k)e^{\frac{j2\pi kn}{N}}}{N}, n = N-P, \ldots, N-1 \quad \text{[Equation]}$$

where $R_p(k,n)$ is the reflection coefficient related to the RIS, k is the subcarrier index, n is the specific index, p is an antenna index, X(k) is the first coefficient, $$e^{\frac{j2\pi kn}{N}}$$

is the second coefficient, N is the IFFT size of the data related to the OFDM signal, P is a length of a cyclic prefix (CP), and $v_p(k)$ is the precoding vector.

10. A wireless device transmitting an orthogonal frequency division multiplexing (OFDM) signal based on a reconfigurable intelligent surface (RIS) in a wireless communication system, the wireless device comprising:

one or more transceivers including the RIS, the one or more transceivers including a reflection coefficient setting unit configured to set a reflection coefficient applied to the RIS;

one or more processors configured to control the one or more transceivers; and one or more memories operably connectable to the one or more processors, wherein the one or more memories are configured to store instructions that allow the one or more processors to perform operations based on being executed by the one or more processors, wherein the operations comprise:

determining the reflection coefficient related to the RIS; and generating the OFDM signal based on the RIS to which the determined reflection coefficient is applied, wherein the RIS includes one or more RISs, wherein the reflection coefficient is determined based on at least one of 1) a first coefficient, 2) a second coefficient, or 3) an inverse fast Fourier transform (IFFT) size of data related to the OFDM signal, wherein the first coefficient is a value determined based on the data related to the OFDM signal, a modulation scheme related to the data, and a subcarrier index related to the OFDM signal, and wherein the second coefficient is a value determined based on a specific index related to the OFDM signal.

11. The wireless device of claim 10, wherein the wireless device is a base station (BS) or a user equipment (UE).

12. A device comprising:

one or more memories; and one or more processors operably connected to the one or more memories, wherein the one or more memories are configured to store instructions that allow the one or more processors to perform operations based on being executed by the one or more processors, wherein the operations comprise:

determining a reflection coefficient related to a reconfigurable intelligent surface (RIS); and generating an orthogonal frequency division multiplexing (OFDM) signal based on the RIS to which the determined reflection coefficient is applied, wherein the RIS includes one or more RISs, wherein the reflection coefficient is determined based on at least one of 1) a first coefficient, 2) a second coefficient, or 3) an inverse fast Fourier transform (IFFT) size of data related to the OFDM signal, wherein the first coefficient is a value determined based on the data related to the OFDM signal, a modulation scheme related to the data, and a subcarrier index related to the OFDM signal, and wherein the second coefficient is a value determined based on a specific index related to the OFDM signal.

* * * * *